Feb. 3, 1959　　　W. KRATT　　　2,871,747
PLASTIC PITCH PIPE
Filed Aug. 2, 1954
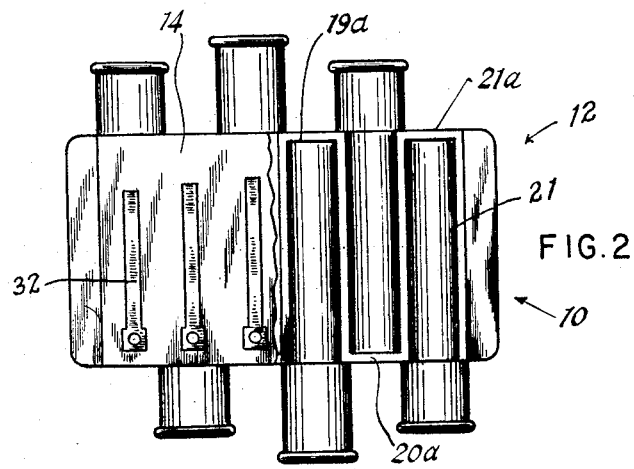
FIG. 2
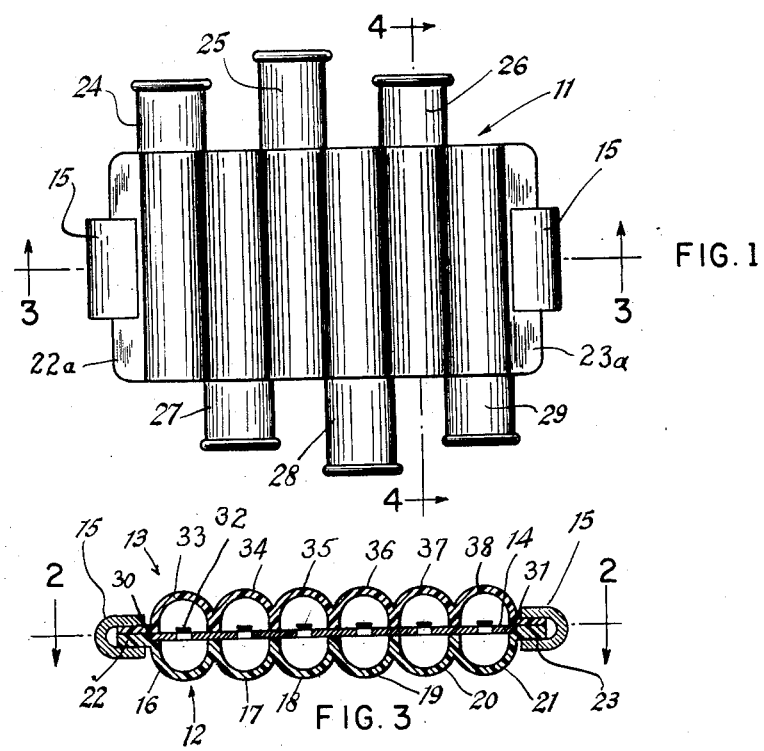
FIG. 1
FIG. 3
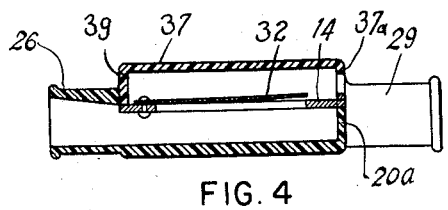
FIG. 4
INVENTOR
William Kratt
BY
ATTORNEY

2,871,747

PLASTIC PITCH PIPE

William Kratt, Union, N. J.

Application August 2, 1954, Serial No. 447,012

3 Claims. (Cl. 84—456)

This invention relates to plastic pitch pipes. More particularly, the invention concerns the multiple, tubular type of pitch pipe in molded plastic form.

In conventional pitch pipes of the multiple tubular type, individual tubular metal reed holders are joined together in side by side relation by a soldering operation, the assembly then being plated and finished, prior to the insertion of the selected reeds into the holders. Such a construction necessarily requires a substantial amount of labor. Furthermore, the nature of the construction makes it impossible to obtain uniform plating finishes, particularly at the soldered portions of the assembly.

Accordingly, an object of this invention is to provide an improved pitch pipe formed of molded plastic which can be made with a minimum amount of labor and which has a uniformly pleasing finished appearance.

Another object of this invention is to provide a molded plastic pitch pipe made up of a pair of molded plastic sections and a metal reed plate which may be easily and economically assembled.

A further object of this invention is to provide a pitch pipe including a single reed plate having a plurality of reeds in side by side relation, such plate being associated with a pair of molded plastic sections formed to provide individual chambers for each of said reeds.

Other objects of this invention will in part be obvious and in part hereinafter pointed out.

In the drawing, Fig. 1 is a top plan view of a pitch pipe embodying the invention;

Fig. 2 is a view similar to that of Fig. 1, with the top section removed;

Fig. 3 is a longitudinal sectional view taken on the line 3—3 of Fig. 1; and

Fig. 4 is a transverse sectional view taken on the line 4—4 of Fig. 1.

Referring in detail to the drawing, 10 designates a pitch pipe embodying the invention. The same comprises a molded plastic casing, generally indicated at 11, the casing being made up of a pair of complementary sections 12, 13, and a reed plate 14 assembled with said sections. The assembled parts are retained by means of U-shaped plastic clips 15 engaging opposite ends of the sections.

Section 12 is formed with a plurality of parallel, elongated chamber portions 16, 17, 18, 19, 20, 21 of semi-cylindrical cross section and having successive common wall portions. Flanges 22, 23 extend outwardly of portions 16, 21 respectively. As shown in Fig. 2, chamber portion 20 is closed off at one end thereof by end wall 20a. The chamber portions 19, 21 on either side of chamber portion 20 are similarly closed off at one end thereof, as by end walls 19a, 21a, respectively, such end walls being disposed on one side of section 12 while end wall 20a is on the other side of said section. Chamber portions 16, 17, 18 are provided with similar end walls and the end walls of the successive chamber portions appear on alternate sides of the section.

The section 12 is further formed with a series of short, tubular mouthpiece portions 24, 25, 26, 27, 28, 29 integral therewith and respectively communicating with chamber portions 16, 18, 20, 17, 19, 21 at the open ends thereof. As shown in Figs. 1, 2, mouthpiece portions 24, 25, 26 project from one side of section 12 while the portions 27, 28, 29 project from the other side thereof, thus providing adequate spacing between successive mouthpiece portions on either side of the section.

The inner edges of flanges 22, 23 are rabbeted as at 30, 31 to receive the ends of reed plate 14 which is disposed over the open side of section 12 bridging the chamber portions thereof and resting on the common walls of said chamber portions which are coplanar with rabbeted edges 30, 31. The reed plate 14 may be formed of metal or other suitable material having elongated openings respectively aligned with the chamber portions, a reed 32 being disposed over each opening and secured to the plate at one end thereof. Each of the reeds is adapted to be set into vibration by a current of air to provide a musical note of the scale.

The section 13 is similar to section 12 in that it is also formed with parallel chamber portions 33, 34, 35, 36, 37, 38 which are respectively aligned with the chamber portions of section 12. As shown in Fig. 4, chamber 37 is closed off at one end by apertured end wall 37a, complementary to end wall 20a of chamber portion 20 underlying chamber portion 37. The other end of chamber portion 37 has an end wall 39 which abuts the inner end of mouthpiece portion 26. It will be apparent that the reed plate 14 lies medially of the sections 12, 13, with end flanges 22a, 23a on section 13 contacting flanges 22, 23 on section 12, and clips 15 engaging the pairs of flanges 22, 22a; 23, 23a to retain the assembled parts.

Each of the other chamber portions 33, 34, 35, 36 and 38 are similarly provided with end walls, whereby a unitary chamber is provided for each of the reeds 32 on the reed plate 14, with a mouthpiece associated therewith. The length of said mouthpiece portions may be separately varied, to facilitate blowing into the several chambers to produce the desired musical note, determined by the specific reed 32.

It will be apparent that the construction of the instant invention provides an improved device made up of a minimum number of parts, each of which is economical to manufacture, and the assembly of which is quite simple. Obviously, the number of chambers in a given pitch pipe may be varied to provide selected combinations of musical notes for tuning various musical instruments.

As various changes might be made in the embodiment of the invention herein shown and described, it is understood that all matter herein shown or described shall be deemed illustrative and not by way of limitation.

Having thus disclosed my invention, I claim as new and desire to protect by Letters Patent:

1. A pitch pipe construction comprising a pair of molded plastic sections and a reed plate in assembled relation, each of said sections being formed with adjacent semi-cylindrical chamber portions to provide when assembled a plurality of tubular chambers in side by side relation, said reed plate being disposed medially of said chambers and including a plurality of spaced vibratory reeds respectively aligned with said chambers, one of said sections including integral mouthpiece portions respectively communicating with said chambers at one end thereof, alternate mouthpiece portions projecting from opposite sides of said section, the other of said sections including end wall portions at each of the chamber portions thereof abutting the inner end of the adjacent mouthpiece portions, and means interengageable with superposed edge portions of said sections for retaining said sections and reed plate in assembled relation.

2. A pitch pipe construction comprising a pair of molded plastic sections, each of said sections being formed with adjacent, semi-cylindrical chamber portions, each of said sections including end wall portions for closing one end of the chamber portions thereof, one of said sections including a plurality of mouthpiece portions respectively communicating with the chamber portions thereof at the other end thereof, a reed plate mounted medially of said sections and having a plurality of spaced vibratory reeds respectively aligned with oppositely disposed chamber portions of said sections, the end wall portions of the other section abutting the upper portion of the mouthpiece portions of the other section respectively adjacent thereto at the inner end thereof the mouthpiece portions of successive chambers projecting alternately from opposite sides of said sections.

3. A pitch pipe construction as in claim 2 wherein said sections include flange portions at the opposite ends thereof and in respectively abutting relation, and U-shaped clip means engaging the abutting flange portions at the opposite ends of said sections for holding said sections and reed plate together.

References Cited in the file of this patent

UNITED STATES PATENTS

| | | |
|---|---|---|
| 478,570 | Congdon | July 12, 1892 |
| 653,451 | Hohner | July 10, 1900 |
| 665,452 | Oefinger et al. | Aug. 7, 1900 |
| 1,366,735 | Kratt | Jan. 25, 1921 |
| 1,437,747 | Congdon | Dec. 5, 1922 |
| 1,538,336 | Kratt | May 19, 1925 |
| 1,796,695 | Kratt | Mar. 17, 1931 |
| 2,726,568 | Lake | Dec. 13, 1955 |

FOREIGN PATENTS

| | | |
|---|---|---|
| 486,894 | France | Feb. 22, 1918 |
| 474,185 | Germany | Apr. 2, 1929 |